United States Patent [19]

Yates

[11] Patent Number: 4,695,779

[45] Date of Patent: Sep. 22, 1987

[54] MOTOR PROTECTION SYSTEM AND PROCESS

[75] Inventor: Kenneth H. Yates, Midland, Tex.

[73] Assignee: Sargent Oil Well Equipment Company of Dover Resources, Incorporated, Tulsa, Okla.

[21] Appl. No.: 864,717

[22] Filed: May 19, 1986

[51] Int. Cl.$^4$ .............................................. H02P 1/04
[52] U.S. Cl. ..................................... 318/484; 318/308; 318/318; 417/1
[58] Field of Search ............... 318/484, 436, 424, 306, 318/308.7, 318; 361/23; 417/1

[56] References Cited

U.S. PATENT DOCUMENTS

| | | | |
|---|---|---|---|
| 3,191,114 | 6/1965 | Reed | 318/484 X |
| 3,306,210 | 2/1967 | Boyd et al. | 417/1 |
| 3,413,535 | 11/1968 | Hubby | 361/23 X |
| 3,515,971 | 6/1970 | Joslyn et al. | 318/308 |
| 3,778,694 | 12/1973 | Hubby et al. | 318/474 |
| 4,028,601 | 6/1977 | Peterson | 318/308 X |
| 4,245,370 | 1/1981 | Baker | 318/461 X |
| 4,322,668 | 3/1982 | Trussler et al. | 36/434 |
| 4,470,092 | 9/1984 | Lombardi | 361/23 |
| 4,504,881 | 3/1985 | Wada et al. | 361/23 |

Primary Examiner—Benjamin Dobeck
Attorney, Agent, or Firm—Richards, Harris, Medlock & Andrews

[57] ABSTRACT

Method and apparatus for providing an electric motor such as used on an oil well pumping unit with stall protection. The system comprises means for generating a signal representative of motor speed and for establishing at least two stall speed set points corresponding to upper and lower stall speeds of the motor. Upon the motor speed signal reaching the upper speed set point for one time duration or the lower stall speed set point for a second short time duration, a motor control function is generated. The system may be used for motors having a plurality of operating modes. In this case, at least two stall condition suites, comprising at least two upper and lower stall speed set points as described above, are established corresponding to at least two motor modes, e.g., high torque and low torque modes. The motor winding leads are monitored to identify whether the motor is in the high torque or low torque mode and the appropriate stall condition suite selected.

25 Claims, 8 Drawing Figures

MOTOR PROTECTION SYSTEM AND PROCESS

TECHNICAL FIELD

This invention relates to stall protectors for electric motors and more particularly to stall protection for motors of the type used as prime movers on oil well pumping units.

ART BACKGROUND

It is a conventional practice to monitor the speed of an electric motor in order to effect motor control actions or to prevent damage to the motor when certain stall conditions occur. For example, a motor may be protected against stall conditions by a system which senses the motor speed and, when it falls to an unacceptably low level and overheats, acts to cut-off the power supply to the motor or otherwise generate an appropriate motor control function. Thus, U.S. Pat. No. 4,504,881 to Wada discloses a motor protection system which comprises a transducer that generates a signal having a frequency proportional to motor speed. The motor speed signal is applied to a control circuit in a feedback terminal and also to the reset terminal of a counter driven by a clock signal. If the motor speed decreases to an undesirably low speed where there is a danger of overheating, the counter times out and applies a signal through a flipflop circuit to turn a transistor in the motor supply circuit off and cuts off power to the motor.

U.S. Pat. No. 4,245,370 to Baker discloses a protective circuit for a vacuum cleaner motor in which a frequency proportional signal generated by a Hall effect transducer is applied to two timers having time-out intervals associated with upper end lower threshold speeds. When the motor reaches the upper threshold speed, the interval between the period of the motor speed signal is sufficiently great that one timer times out to generate a signal energizing a caution light. If the motor speed falls to the lower threshold value resulting in a greater period for the frequency proportional signal, the second timer times out and generates a function to open a switch in the motor supply circuit.

Motor protection systems are also used in the oil industry for the protection of electric motors employed as prime movers in sucker-rod type pumping units. Sucker-rod pumping units are widely used in the oil industry in order to recover fluids from wells extending into subterranean formations. Such units include a sucker-rod string which extends into the well to drive a downhole pump and means at the surface of the well for reciprocating the rod string. Typical of such units are the so-call "beam type" pumping units in which the sucker-rod string is suspended from a walking beam which is pivotally mounted on a Sampson post and driven by an electric motor. The load on the electric motor varies widely during each pumping cycle and it is a conventional practice to monitor the operation of the unit and to shutdown the motor upon the occurrence of an unacceptable fault condition. For example, U.S. Pat. No. 3,778,694 to Hubby discloses a system for detecting a "pump off" condition by monitoring the load on the motor during the downstroke of the pumping unit. When the system detects a motor load which is abnormally low in comparison with a predetermined standard, it acts to remove power from the motor.

DESCRIPTION OF THE INVENTION

In accordance with the present invention, there is provided a protective system for a motor designed to run under conditions of varying speed and having at least two operating modes as determined by the connections of the motor winding leads. The system comprises a transducer to generate a motor speed signal representative of the speed of the motor and means establishing at least two stall condition suites which correspond respectively to the different operating modes of the motor. Each of the stall condition suites has at least two set points. The first of these set points corresponds to an upper stall speed and the second to a lower stall speed. The system further comprises means for monitoring the connections of the motor winding leads to ascertain the motor mode, for example, to determine whether the motor is in a high torque mode or a low torque mode, and the appropriate stall condition suite corresponding to the existing motor mode is selected. The system further comprises means for comparing the motor speed signal with the set points of the selected stall speed suite and for generating a motor control function in response to timing functions associated with the set points. Thus, the motor control function is generated in response to the motor signal having a value corresponding to the upper speed set point for one predetermined time duration or having a value corresponding to the second lower speed set point for a second elapsed time duration which is shorter than the first time duration.

In a further aspect of the invention, there is provided a method for regulating the operation of a well produced by a sucker-rod type pumping unit. The reciprocating means for the rod string is driven by an electric motor under conditions in which the motor speed normally varies from maximum values near the ends of strokes of the rod string and at minimum values at intermediate occurrences during the strokes of the rod string. Two or more stall speed set points are established with one set point corresponding to an upper stall speed and another set point corresponding to a lower stall speed. A motor speed signal representative of the speed of the motor is compared with the set points to generate a motor control function under the appropriate conditions. Thus, the motor control function is generated in response to the motor signal having a value corresponding to the upper stall speed set point for one predetermined elapsed time duration or having a second lower value corresponding to the lower stall speed set point for a second time duration which is shorter than the first elapsed time period.

In a preferred embodiment of the invention, the motor speed signal is a pulsed signal such as may be derived from a Hall effect transducer or other suitable signal generating means which is frequency proportional to the motor speed. Thus, the period of the motor speed signal between pulses increases with decreasing motor speed. In this case, the set points are time interval segments corresponding to the periods of the motor signal at the upper and lower stall speed conditions. The time interval segment for the first upper stall speed set point is shorter than the time interval for the second, lower stall speed, set point. First and second timers are associated respectively with the set points. The timers function to produce a time-out condition at the conclusion of an appropriate elapsed time. The elapsed time for the first timer is of a longer duration than the elapsed time for the second timer. In this embodiment, the first timer is reset when the period of the motor speed signal is within the first set point time interval and the second timer is reset when the period of the motor speed signal is within the second, longer set point time interval. When either timer times out, a motor control function is generated.

BEST MODES FOR CARRYING OUT THE INVENTION

The invention will be described initially with reference to its use in regulating the operation of a variable speed high slip induction motor used as a prime mover in a beam pumping unit. The invention is especially well suited to this application. However, as will become apparent from the following description, the invention may be employed in numerous other motor operations which because of varying loads or for other reasons, experience either cyclically or randomly varying speed conditions.

Figure 1:
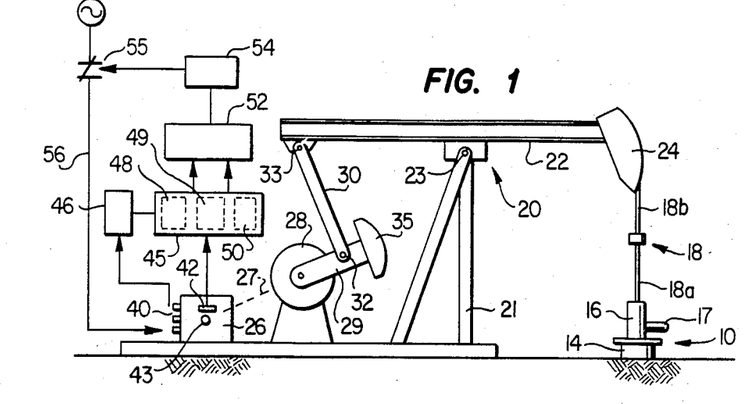
FIG. 1 is a schematic block diagram illustrating the use of the invention to provide a stall protection for an electric motor used as a prime mover of a sucker-rod type pumping unit.

Turning first to FIG. 1, there is illustrated the wellhead 10 of a well which extends from the earth's surface into a subterranean oil producing formation (not shown). The wellhead comprises the upper portions of a casing string 14 and a tubing string 16 which extends to a suitable depth within the well, e.g., adjacent the subterranean formation. Liquid from the well is produced through the tubing string 16 by means of a downhole pump (not shown) to the surface where it passes into a gathering line 17.

The downhole pump is actuated by reciprocal movement of a sucker-rod string 18. Rod string 18 is suspended in the well from a surface support unit 20 having a walking beam 22 which is pivotally mounted on a Sampson post 21 by a pin connection 23. The sucker-rod string includes a polished rod section 18a which extends through a stuffing box (not shown) at the top of the tubing string and a section 18b formed of a flexible cable. The cable section 18b is connected to the walking beam 22 by means of a "horsehead" 24.

An electric motor drives the walking beam through a drive system 27, e.g., a belt drive, a crank 28, a crank arm 29, and a pitman 30 which is pivotally connected between the crank arm and walking beam by means of pin connections 32 and 33. The outer end of crank arm 29 is provided with a counterweight 35 which balances a portion of the load on the sucker-rod string in order to decrease the load variations on the electric motor.

Figure 2A:
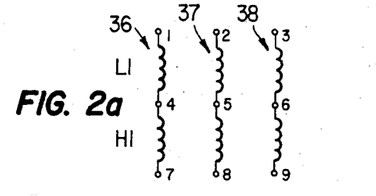
FIG. 2A is a schematic illustration of the motor windings for a nine lead motor.

The motor 26 may be of any suitable type, but usually will take the form of a high slip induction motor having six, nine or twelve leads which can be connected in different configurations to give a plurality of operating modes. It will be recognized, however, that the invention can also be employed with a single mode motor having only three leads, although without the motor mode scanning feature as described hereinafter. A typical motor used in oil field operations is a nine lead, four mode motor such as the Sargent Econo-Pac motor available from Sargent Oil Well Equipment Co. FIG. 2A illustrates schematically the motor windings and terminal leads for such a nine lead motor. Thus, motor windings 36, 37 and 38 are illustrated as compound impedance windings, each having a low impedance leg designated by LI and a high impedance leg desigated by HI. The leads for windings 36, 37 and 38 are designated as leads 1 through 9 as illustrated in FIG. 2A. To connect the motor windings in a high torque mode, the motor windings are connected in a delta connection with power applied to leads 1, 2 and 3. In this case, the connections will be between leads 1 and 9, 3 and 8, and 2 and 7 to arrive at the delta connection illustrated in FIG. 2B. For the low torque mode, terminal leads 7, 8 and 9 are connected with power applied to leads 1, 2 and 3 to arrive at a Y configuration . Intermediate torque modes for the motor may be arrived at by applying power to leads 7, 8 and 9 and connecting leads 2 and 4, 3 and 5, and 1 and 6 for a modified Y configuration or by connecting leads 4 and 8, 5 and 9, and 6 and 7 with power to leads 1, 2, and 3 for a modified delta configuration. Referring to FIG. 1, these connections may be made at a terminal board indicated schematically by reference numeral 40.

In the normal course of operation of the pumping unit shown in FIG. 1, the speed of the electric motor will undergo excursions between maximum values which normally occur near the end of the upstroke and the downstroke and minimum values which occur at intermediate locations during the upstroke and downstroke. By way of example, the motor speed may vary from a value of about 1200 rpm at the top of the upstroke and the beginning of the downstroke. As the pump begins the downstroke, the load on the motor 26 will increase and the motor will pass through a minimum value of perhaps 700 rpm and then begin to increase until it reaches a maximum value at the end of the downstroke and the beginning of the upstroke.

As shown in FIG. 1, the motor 26 is equipped with a transducer 42 which functions to generate a motor speed signal. Transducer 42 may be of any suitable type, but preferably will take the form of a Hall effect transducer or similar type transducer which generates a pulse signal which is frequency proportional to the motor speed. Thus, the period of the signal between pulses varies inversely with motor speed. Where transducer 42 is a Hall effect transducer, the motor shaft 43 may be provided with a magnet (not shown) so that a pulse is generated for each revolution of the motor. Of course, the transducer system may be configured to generate more than one pulse for each motor revolution, but in the following discussion, it will be assumed that the pulse rate is one per revolution.

The motor speed signal is applied to a controller register 45 which is under the control of a torque mode monitor 46 which scans the terminal board 40 of the motor to determine the torque mode in which the motor is operating. The controller register contains a plurality of set point generators each of which generates a stall condition suite corresponding to one or more torque modes of the motor. In the embodiment illustrated in FIG. 1, the register 45 contains three set point generators 48, 49 and 50. Generator 48 produces a suite of at least two stall speed set points appropriate for use when the motor is connected in high torque mode. Set point generator 50 similarly corresponds to the low torque mode configuration and generator 49, is selected by the monitor 46 when the motor is in either of the intermediate torque mode configurations. Alternately, and in many cases preferably, there may be provided a separate suite of stall speed set points for each of the intermediate torque modes.

The motor speed signal and the selected suite of set points selected by monitor 46 are applied to a comparator 52 which operates to generate a motor control function when the motor speed signal reaches and stays at a stall speed set point for a predetermined elapsed time duration. In the embodiment illustrated, the output from the comparator functions to activate a controller 54 which opens a contactor 55 in the power supply circuit 56 of the motor 26.

As explained in greater detail below, each stall condition suite has at least two set points which can be set by means of hard wired logic or by means of a properly programmed general purpose or special purpose digital computer. The higher speed set point is indicative of an initial running stall condition at which the motor will be allowed to run for a relatively long elapsed time duration before generation of the motor control function. The other stall condition(s) represent lower motor speed(s) for which the elapsed time duration(s) are shorter. By way of example, each stall condition suite comprises three stall conditions which are specific to the corresponding torque mode and a fourth stall condition (the no signal condition) which is common to all torque modes. The relationship between stall conditions for a given torque mode condition is set forth in the following table:

TABLE I

| Stall Condition | Motor Speed | Set Point Interval (msec.) | Elapsed Time |
|---|---|---|---|
| 1. HI | 600 | 100 | 10 |
| 2. Middle | 400 | 150 | 7 |
| 3. Low | 200 | 300 | 4 |
| 4. No Signal | | | 2 |

In Table I, the first column indicates the stall condition, the second column the motor speed at the stall condition, the third column the set point time interval in milliseconds (assuming one signal pulse per revolution of the motor) and the fourth column the acceptable elapsed time duration before a motor control function is generated. The first three stall conditions are specific for the particular stall condition suite corresponding to the selected motor mode and the fourth (no signal condition) is common to all stall condition suites.

When the motor 26 is first energized to place the pumping unit on operation, the no signal function will promptly (in 2 seconds) function to cutoff power to the motor should the motor fail to come up to a safe speed for any reason. This is particularly advantageous in the case of well pumping units equipped with brakes which are actuated during workover operations and the like which prevent the pumping unit from operating. In the event the brake is left on at the conclusion of the workover, the no signal function will prevent the motor from burning out when the pumping system is placed on line.

As indicated in Table I, once the motor is started and brought up to speed for normal operation the initial or high stall condition is 600 rpm. The set point for this stall condition is a time interval of 100 msec assuming that the motor speed signal comprises one instantaneous pulse for each revolution. For the stall condition suite illustrated, so long as the motor speed is above 600 rpm, the comparator functions to reset the timing function associated with the high stall condition (and also the lower speed stall conditions) and the motor continues to operate. As the motor speed falls below 600 rpm, the period of the motor speed signal (the time interval between pulses) exceeds 100 msec and the timing function continues. If within ten seconds the high stall condition timing function is cleared (reset as a result of the motor speed increasing above 600 rpm) then the motor will continue to operate. However, if the speed remains below 600 rpm so that the period of the speed signal is greater than 100 msec, the timing function will not be cleared and at the end of the elapsed time duration of ten seconds, the time-out condition will be established and a motor control function generated. Similar considerations apply for the lower stall speed conditions. Thus, if the motor speed falls below 200 rpm, the period (time between pulses) of the motor speed signal will be greater than the set point time interval of 300 msec. If the motor speed stays below 200 rpm for four seconds, the timing function will time-out to result in the motor control function. The "no signal" condition is common to all stall condition suite functions to generate the motor control signal if no signal pulse is received within two seconds (indicative of a motor speed of 30 rpm or less).

It will be recognized that the values given in Table I are arbitrarily assigned and represent the set point parameters for only one suite of stall conditions for a particular torque mode or modes for a particular motor. They will vary from one motor to another and with the configuration of the motor windings. However, there is a general relationship between the torque mode configuration of the motor and stall speeds in that a relatively high torque mode configuration will normally have a somewhat higher stall speed range than a lower torque mode configuration. For example, in relation to the values shown in Table I, the stall condition motor speeds given would be appropriate for the low torque mode configuration (Y configuration) of the Sargent Econo-Pac motor described previously. For this same motor in the high torque mode (the delta configuration illustrated in FIG. 2B) appropriate high, middle and low stall condition motor speeds would be about 950, 630 and 300 rpms. In this case, the set point intervals would be 63, 96, and 200 msecs, respectively, with the lapsed time durations remaining the same at 10, 7 and 4 seconds. Thus, when going from lower to higher torque modes, the upper and lower stall condition limits increase in terms of motor speed and decrease in terms of set point time intervals. To simplify software programming or to minimize the use of hard wired logic chips, the elapsed time durations will normally remain the same, although it will be recognized that these can also be varied from one stall condition suite to another.

Figure 3:
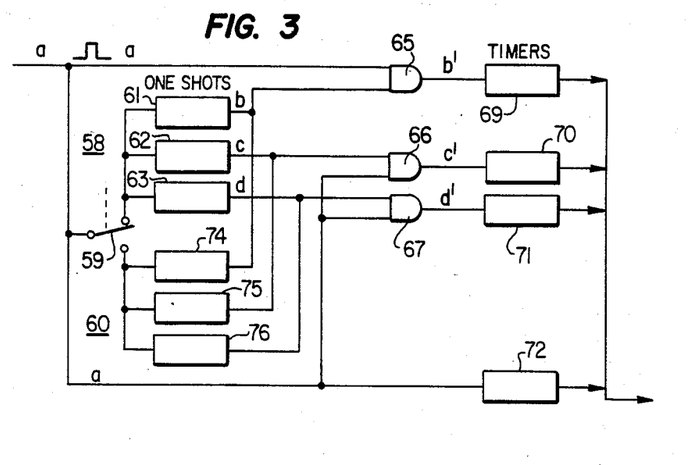
FIG. 3 is a schematic illustration of one embodiment of the invention employing hard wired logic circuitry.

Turning now to FIG. 3, there is illustrated one form of hard wired logic circuitry which may be employed to implement multi set point stall condition suites of the type illustrated by Table I. In FIG. 3, two stall condition suites are illustrated as represented by first and second banks 58 and 60 of integrated circuits having retriggerable monostable multivibrator logic (one shots). As shown, a selector 59 under control of torque mode monitor 46 is in the position to select suite 58.

Figure 4:
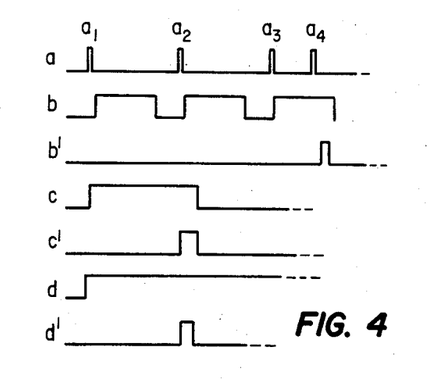
FIG. 4 is an illustration of exemplary wave forms for the circuitry shown in FIG. 3.

FIG. 4 illustrates the waveforms as indicated by the lower case letters appearing in FIG. 3. In operation of the circuit shown in FIG. 3, the motor speed signal a is supplied to one shot units 61, 62 and 63 having progressively increasing time constants and to AND gates 65, 66 and 67. One shot 61, corresponding to the high stall condition of Table I produces a positive pulse having an interval of 100 msec before returning to the stable state. One shot 62 corresponding to the middle stall condition has a time constant of 150 msec and one shot unit 63 corresponding to the low stall condition has a time constant of 300 msec. The outputs of AND gates 65, 66 and 67 are applied to the reset terminals of timers 69, 70 and 71, respectively. Corresponding to the elapsed time parameters shown in Table I, timers 69, 70 and 71 will time-out at elapsed time durations of ten, seven and four seconds, respectively.

With reference to the waveforms shown in FIG. 4, the motor speed is initially about 430 rpm resulting in a period between pulses of about 140 msec. In this case, pulse $a_1$ triggers the monostable unit 61 which returns to the stable state before the next succeeding pulse $a_2$ and the output b' from the AND gate 65 remains flat and timer 69 is not cleared. However, pulse $a_2$ occurs during the positive state of monostable units 62 and 63 resulting in positive outputs c' and d' from AND gates 66 and 67 which clear timers 70 and 71, respectively. At a later point, as indicated by pulses $a_3$ and $a_4$ in the timing pattern, the motor speed has increased to 750 rpm, resulting in a period between pulses $a_3$ and $a_4$ of 80 msec. As a result, pulse $a_4$ is applied to AND gate 65 while the output b of one shot unit 61 is positive resulting in a positive output b' from AND gate 65 which functions to clear the timer 69.

Should the torque mode of the motor be changed, selector 59 would be switched to the lower contact to select one shot units 74, 75 and 76 with a different set of time constants producing a second suite of stall condition set points. In either case, motor speed signal a is applied directly to timer 72 which will not time out unless the duration between signal pulses exceeds two seconds.

Figure 5:
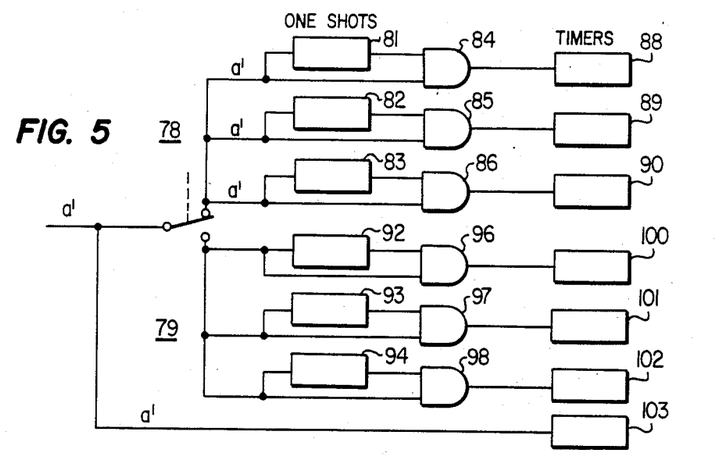
FIG. 5 is an illustration of a modified form of hard wired logic circuitry embodying the present invention.

FIG. 5 illustrates an alternative embodiment in which separate AND gates and timers are employed for each of two stall condition suites 78 and 79. Thus, suite 78 comprises one shot units 81, 82 and 83 of progressively increasing time constants which are connected along with the channel for motor signal a' to the inputs of AND gates 84, 85 and 86. The AND gate outputs are applied to timers 88, 89 and 90, respectively, which function as described above with reference to FIG. 4. One shot units 92, 93 and 94, along with their associated AND gates 96, 97 and 98, generate a second suite of set points for a different torque mode configuration of the motor. The outputs from AND gates 96, 97 and 98 are applied to timers 100, 101 and 102. Instead of using separate timers for the second suite of set point generators, the outputs from AND gates 96, 97 and 98 could, of course, be applied to timers 88, 89 and 90, respectively. In either case, the motor speed signal a' will be applied directly to the no pulse timer 103 similarly as described above with respect to FIG. 4.

Figure 6:
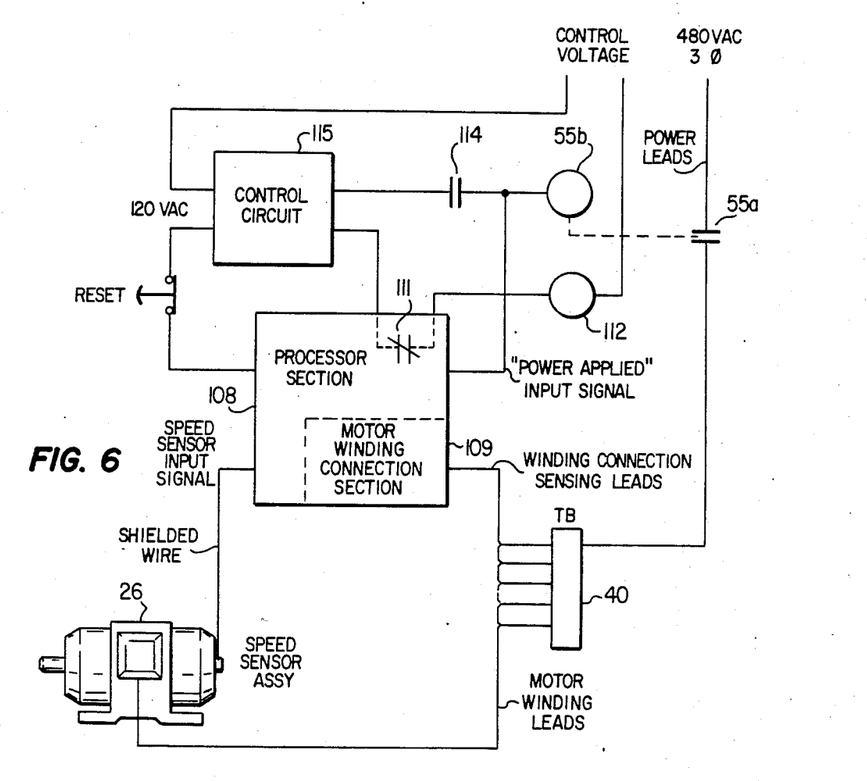
FIG. 6 is a schematic illustration of the invention as implemented by a special purpose digital computer.
Figure 7:
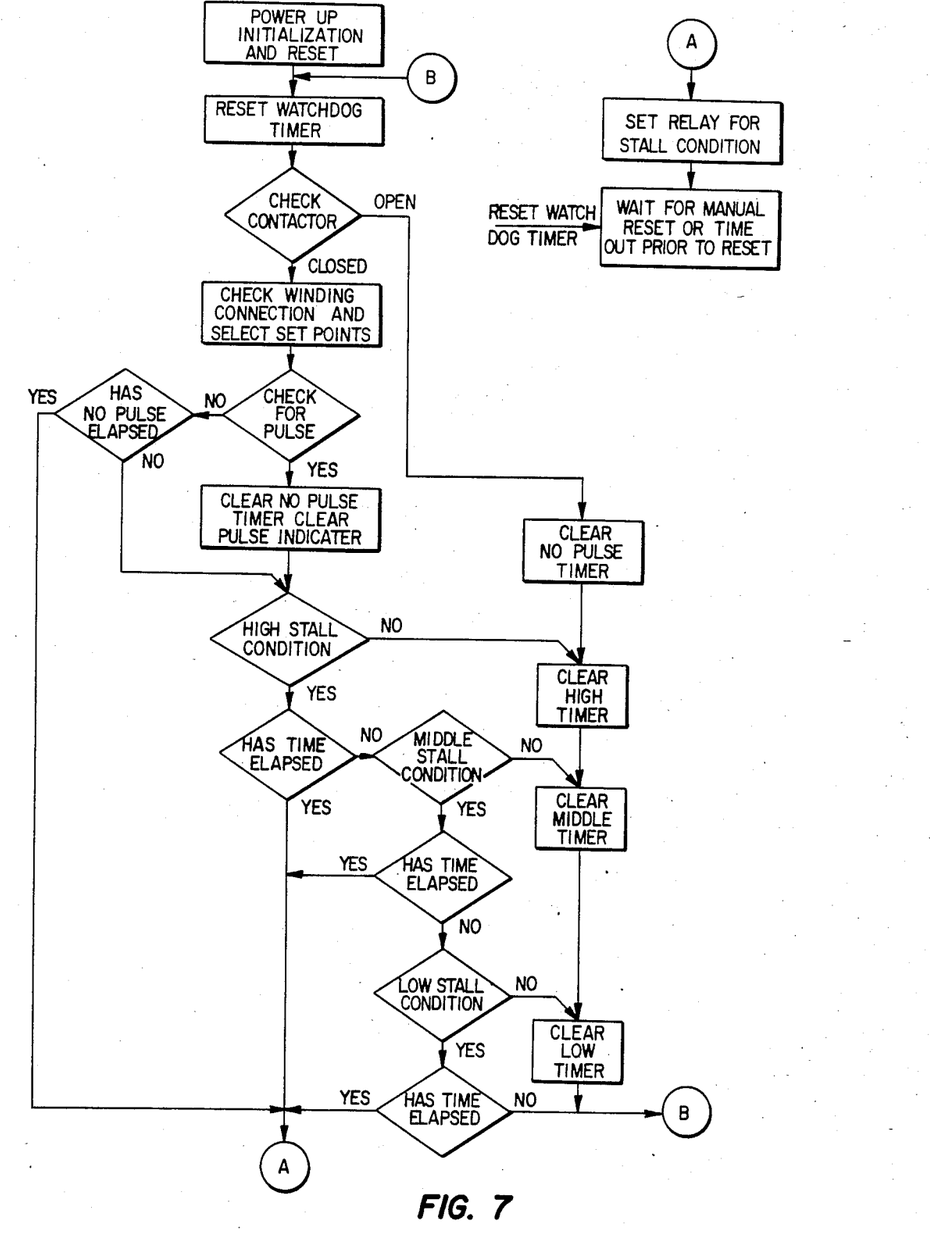
FIG. 7 is a flow chart of the program routine for the processor of FIG. 6.

FIG. 6 is a block diagram illustrating the implementation of the invention employing a digital computer and FIG. 7 is a flow chart illustrating the attendant computer routines. As shown in FIG. 6, the motor 26 is supplied by power applied to the terminal board 40. The contactor 55 for control of the motor comprises a set of contacts 55a in the power leads under the control of a relay coil 55b. The contacts are closed when the coil 55b is energized. The control unit 106, embodying the invention, comprises a processor section 108 and a monitor section 109 which checks the voltage on the motor windings to determine the torque mode configuration of the motor. The processor section 108 includes a microprocessor, timing circuitry, an EPROM, circuitry for a watchdog timer, and an output relay to open a normally closed contact 111 in the circuit for a control relay 112. Contact 111 is normally closed so that should the processor section lose power or fail for any reason to operate properly, control relay 112 will remain energized holding contacts 114 closed in the circuit for the control coil 55b. The processor section monitors the "power applied" input signal and in the event contactor coil 55b is deenergized by the normal motor control circuitry 115, thus opening contactors 55a, the processor section is disabled from generating the motor control function.

The monitor section 109 comprises voltage sensing circuitry which is connected to some or all of the motor winding leads at the terminal board 40. The monitor section determines the torque mode configuration of the motor by sensing voltage parameters at the selected motor winding leads to determine the presence of a voltage differential or, where the motor windings are connected together, a no voltage condition.

Figure 2B:
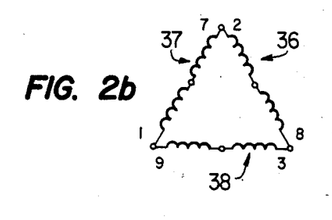
FIG. 2B is a schematic illustration of the motor windings of FIG. 2A connected in a delta configuration.

Preferably, relative voltage values are sensed for some of the motor winding terminals in order to make the torque mode determination. By way of example and returning to a consideration of the nine lead, four mode system depicted by FIG. 2, the torque mode for the motor can be determined by sensing the voltages at winding leads 2, 3, 4, 8 and 9 to detect a comparative voltage, no voltage situation by comparing the voltage at lead 3 with lead 8, lead 2 with lead 4, lead 4 with lead 8, and lead 9 with lead 8. For the four torque mode configurations described previously, the relative voltage is shown in the following table in which HV indicates a high voltage ratio and NV indicates a low voltage ratio.

TABLE II

| Voltage Ratios | Leads | Comparisons | | |
|---|---|---|---|---|
| | 3/8 | 2/4 | 4/8 | 9/8 |
| High Torque (Delta) | NV | HV | HV | HV |
| Medium Torque (mod delta) | HV | HV | NH | HV |
| Medium Low Torque (mod Y) | HV | NV | HV | HV |
| Low Torque (Y) | HV | HV | HV | NV |

As shown in Table II, by looking at the ratios between voltages appearing at the various motor lead terminals, the torque mode configuration can be readily determined without the need for precise voltage measurements. Thus, as indicated in Table II, for the high-torque delta configuration, the ratio of the measurement of the voltages appearing at leads 3 and 8, will show little or no voltage differential since they are shorted together. However, a measurement of the comparative voltages at leads 2/4, 4/8, and 9/8 will show relatively wide voltage differentials, although the voltage differentials, or the ratio of one voltage to the other, may not be the same for each set of leads compared.

As shown in FIG. 7, the microprocessor employs three stall condition timers, which for purposes of illustration only correspond to the three stall conditions in Table I, and a no pulse timer. All timers depicted are under control of a master timer in the processor hardware. The master timer is incremented with each processor clock cycle until it reaches a maximum value at which point it is reset to zero. Each time the master timer is reset to zero, it outputs an interrupt signal to the microprocessor which responds by running a interrupt routine program to increment each of the high, middle and low timers and the no pulse timer. An overflow counter, which is used in determining the time interval between pulses in the motor speed signal, is also incremented.

The program loops repeatedly at time intervals, which vary depending upon which routines are run, of a few milliseconds and, as shown in FIG. 7, is under control of an optional watchdog timer. The watchdog timer is reset with each loop of the program in proper operation. If the program malfunctions or fails for any reason to reset the watchdog timer within a designated time interval, e.g., 28 milliseconds, the watchdog timer times out to reinitiate the program and reset all program parameters.

When the program is initiated by a powerup, reset or watchdog timer function, it checks the status of contactor 55 in the power supply circuit for the motor. If the power is off, indicated by a contactor open state, the program functions to reset all the timers and counters to zero and resets the watchdog timer. The program continues to loop on these steps until it detects a contact closed state or program power is turned off. This feature disables the system from generating a motor control function which would indicate a stall condition (deenergizing relay 112 to open contacts 114 in FIG. 6) which would prevent later start of the motor by the normal motor control circuitry.

If the motor supply contactor 55 is closed, the program branches into the normal motor running operation loop. This program checks the output from the motor winding connection section of the hardware and determines which torque mode configuration exists and loads the appropriate set points for this torque mode configuration from the EPROM to the RAM. After establishing the correct suite of set points, the program checks the pulse indicator memory location to see if a pulse (speed sensor signal) has been received. If a pulse is indicated, the pulse clears the no pulse timer (the two second timer indicated in Table I) and the pulse indicator memory location. If a pulse is not indicated in the pulse indicator memory, the program checks the no pulse timer and assuming that the no pulse duration (two seconds) has not elapsed since the previous pulse, the program proceeds to check for a high stall condition. If the no pulse duration has elapsed, the motor control function is generated. If there is no high stall condition, i.e., if the elapsed time interval between the last two pulses is less than the high stall speed set point (100 msec in Table I), the program clears the high stall speed timer and the lower stall speed timers. So long as this condition prevails, the program will continue to loop back to the first step of resetting the watchdog timer and the program routine as described above will be repeated until the motor power goes off or the high stall condition set point is reached.

If the high stall condition set point is reached (the signal period is greater than 100 msec for the system in Table I) the program will check to see if the elapsed time duration (10 seconds) has expired. If it has not, the program checks to see if there is a middle stall condition (for the parameters illustrated in Table I, if the interval between pulses exceeds 150 msec) and if it is not, it clears the middle and low stall speed timers. If the middle stall speed set point has been reached, the program checks to see if the elapsed time duration (seven seconds) for this stall point has been exceeded. If the seven second interval has elapsed, the motor control relay is set to indicate a stall condition. If not, the program checks to see if there is a low stall condition, that is, if the interval between the last two pulses is greater than the 300 msec. If not, the timer corresponding to the low stall speed condition is cleared.

For a stall point condition, the program will be repeated a number of times before the elapsed time duration is exceeded. If, before the elapsed time duration has been exceeded, the motor speed increases above the set point for the stall speed involved, reentry into the main program loop does not clear the higher stall speed timer(s) unless, of course, the motor speed exceeds the set point(s) conditions corresponding to the higher stall speed(s).

From the foregoing description, it will be recognized that the present invention allows the motor to operate at stall conditions without shutdown so long as the stall condition does not exist for a unacceptably long time at the stall speed involved. By providing for progressively longer elapsed time durations as the stall speed rises, unnecessary motor shutdowns are avoided. This is particularly important in the case of beam pumping units which usually operate unattended and which upon shutdown require inspection before restarting the motor. It will also be recognized that the number of stall condition set points for a particular motor configuration can be increased or decreased from those given in the example depicted above. Also, while the invention is described in regard to discrete well separated set points, it will be recognized that many closely spaced set points can be employed. The ultimate of this would be to implement the invention using a continuous set point function throughout the stall speed range and a continuous time function for the elapsed time duration before the motor is shutdown.

Having described specific embodiments of the present invention, it will be understood that modification thereof may be suggested to those skilled in the art, and it is intended to cover all such modifications as fall within the scope of the appended claims.

I claim:

1. In a protection system for a motor designed to run under conditions of varying speed and having a plurality of operating modes as determined by the connections of the leads of the windings of said motor, the combination comprising:
   a. means for generating a motor speed signal representative of the speed of said motor;
   b. means establishing at least two stall condition suites corresponding respectively to at least two of said motor modes and each having at least two stall speed set points, the first of said set points corresponding to an upper stall speed and the second of said stall points corresponding to a lower stall speed;

c. means for monitoring at least some of the connections of said motor winding leads to determine the existing operational motor mode and selecting the stall condition suite corresponding to the existing motor mode; and d. means for comparing said motor speed signal with the selected stall speed suite and in response to said motor speed signal having a value corresponding to said upper stall speed set point for a predetermined time period or having a second lower value corresponding to said second stall speed set point for a second time period which is shorter than said first time period generating a motor control function.

2. The system of claim 1 wherein said motor winding monitoring means comprises means for sensing a parameter representative of the voltage appearing at at least some of said motor winding terminals.

3. The system of claim 2 wherein said sensing means comprises means for sensing relative voltage values between said motor winding connections.

4. The system of claim 1 further comprising means for monitoring power supplied to said motor and for disabling operation of said protection system in response to an interruption in said power.

5. In a method for regulating the operation of a well produced by the operation of a pumping unit including a sucker-rod string and means for reciprocating said sucker-rod string to produce fluid from a subterranean location within said well, the steps comprising:

a. driving said rod string reciprocating means with an electric motor energized by an electric power supply to said motor under conditions in which the speed of said motor normally varies between maximum values and minimum values occurring during strokes of said rod string;

b. establishing at least two stall speed set points, the first of said set points corresponding to an upper stall speed for said motor, and the second of said stall points corresponding to a lower stall speed of said motor;

c. generating a motor speed signal representative of the speed of said motor; and d. comparing said motor speed signal with said stall speed set points and in response to said motor speed signal having a value corresponding to said first stall speed set point for a first predetermined time period or having a second lower value corresponding to said second stall speed set point for a second time period which is shorter than said first time period, generating a motor control function.

6. The method of claim 5 wherein said motor is shut down in response to said motor control function.

7. The method of claim 5 wherein said motor has at least two operating modes and further comprising the step of establishing at least two stall condition suites corresponding respectively to at least two of said motor modes and for each suite establish at least two stall speed set points as set forth in step (b) of claim 5, and repeatedly determining the existing motor mode of said motor and selecting the stall condition suite corresponding to the determined operational motor mode, and for the selected stall condition suite, comparing said motor signal with the set points thereof and generating a motor control function as set forth in step (d) of claim 5.

8. The method of claim 7 wherein said motor has a plurality of alternatively connectable winding leads and the operational mode of said motor is set by the manner in which the winding leads of said motor are connected and further comprising the step of determining the existing motor mode of said motor by sensing a parameter representative of the voltage appearing at at least some of said motor winding leads.

9. The method of claim 8 wherein said sensing step comprises sensing relative voltage values appearing at at least some of said motor winding leads.

10. The method of claim 5 further comprising the step of monitoring the power supply to said electric motor and in response to an interruption in said power supply terminating the operation of step (d) of claim 5.

11. The method of claim 5 wherein said motor speed signal is a pulse signal which is frequency proportional to said motor speed whereby the period of said signal between pulses increases with decreasing motor speed and wherein said set points are time intervals in which the time interval for said first stall speed set point is shorter than the time interval for said second stall speed set point.

12. In a system for protecting a motor designed to run under conditions of varying speed against stall conditions, the combination comprising:

a. means for providing a pulsed motor speed signal which is frequency proportional to said motor speed whereby the period of said signal between pulses increases with decreasing motor speed;

b. means for establishing at least two stall speed set points, the first of said set points corresponding to an upper stall speed of said motor and comprising a time interval corresponding to the period of said motor signal at said upper stall speed condition, and the second of said set points corresponding to a lower stall speed condition and comprising a time interval which is longer than said first time interval and corresponds to the period of said motor speed signal at said lower stall speed condition;

c. first and second timers for producing a timeout condition at the conclusion of an elapsed time duration, the elapsed time duration for said first timer being longer than the elapsed time duration for second timer;

d. means responsive to said motor speed signal for resetting said first timer when the period of said signal between said pulses is within said first set point time interval;

e. means responsive to said motor speed signal for resetting said second timer when the period of said signal between said pulses is within said second set point time interval; and f. means responsive to the occurrence of a time out condition for one of said timers for generating a motor control function.

13. The system of claim 12 wherein said motor control function acts to shut down said motor.

14. The system of claim 13 further comprising reans for monitoring power supplied to said motor and resetting said timers in response to an interruption in said power.

15. In a system for the protection of a motor having a plurality of operating modes against stall conditions, the combination comprising:

a. means for providing a pulsed motor speed signal which is frequency proportional to said motor speed whereby the period of said signal between pulses increases with decreasing motor speed;

b. means establishing at least two stall condition suites corresponding respectively to at least two of said motor modes and having at least two stall speed set points, the first of said set points corresponding to an upper stall speed and the second of said set points corresponding to a lower stall speed;

c. means for monitoring said motor to determine the existing operational mode of said motor and selecting the stall condition suite corresponding to the existing motor mode; and d. means for comparing said motor speed signal with the selected stall speed suite and in response to said motor speed signal having a value corresponding to said upper first stall speed set point for a first predetermined time duration or having a second lower value corresponding to said second stall speed set point for a second predetermined time duration which is shorter than said first time duration, generating a motor control function.

16. The system of claim 15 wherein said motor control function acts to shutdown said motor.

17. In a system for protecting a motor having a plurality of operating modes against stall conditions, the combination comprising:

a. means for providing a pulsed motor speed signal which is frequency proportional to said motor speed whereby the period of said signal between pulses increases with decreasing motor speed;

b. means for establishing at least two stall condition suites corresponding respectively to at least two of said motor modes and each having at least two stall speed set points, the first of said set points corresponding to an upper stall speed of said motor and comprising a time interval corresponding to the period of said motor signal at said upper stall speed condition, and the second of said set points corresponding to a lower stall speed condition and comprising a time interval which is longer than said first time interval and corresponds to the period of said motor speed signal at said lower stall speed condition;

c. means for surveying said motor to determine the existing operational motor mode and selecting the stall condition suite corresponding to the existing motor mode;

d. first and second timers for producing a time out condition at the conclusion of an elapsed time duration, the elapsed time duration for said first timer being longer than the elapsed time duration for second timer;

e. means responsive to said motor speed signal for resetting said first timer when the period of said signal between said pulses is within said first set point time interval of said selected stall condition suite;

f. means responsive to said motor speed signal for resetting said second timer when the period of said signal between said pulses is within said second set point time interval of said selected stall condition suite; and g. means responsive to the occurrence of a time out condition for one of said timers for generating a motor control function.

18. The system of claim 17 wherein said motor control function acts to shut down said motor.

19. The system of claim 18 further comprising means for monitoring power supplied to said motor and resetting said timers in response to an interruption in said power.

20. In a method of providing stall protection for an electric motor energized by an electric power supply operating under conditions of varying speed the steps comprising:

a. generating a pulsed motor speed signal which is frequency proportional to the speed of said motor whereby the period of said signal between pulses increases with decreasing motor speed;

b. establishing at least two stall speed set points, the first of said set points corresponding to an upper stall speed of said motor and comprising a time interval corresponding to the period of said motor signal at said upper stall speed, and the second of said set points corresponding to a lower stall speed and comprising a time interval which is longer than said first set point time interval and corresponds to the period of said motor speed signal at said lower stall speed; and c. comparing said motor speed signal with said stall speed set points and, in response to the period of said motor speed signal exceeding the time interval of said first stall speed set point for a first time duration or exceeding the longer time interval of said second stall speed set point for a second time duration which is shorter than said first time duration, generating a motor control function.

21. The method of claim 20 wherein said motor is shutdown in response to said motor control function.

22. The method of claim 21 further comprising the step of monitoring the power supply to said electric motor and terminating the operation of step (c) of claim 20 in response to an interruption in said power supply.

23. The method of claim 20 wherein said motor has a plurality of operating modes and further comprising the step of establishing at least two stall condition suites corresponding respectively to at least two of said motor modes and for each suite establishing at least two stall speed set points as set forth in step (b) of claim 20, determining the existing mode of said motor and selecting the stall condition suite corresponding to the determined operational mode, and for the selected stall condition suite comparing said motor signal with the set points thereof and generating a motor control function as set forth in step (c) of claim 20.

24. The method of claim 23 wherein said motor has a plurality of alternatively connectable winding leads and the operational mode of said motor is set by the manner in whih the winding leads of said motor are connected and further comprising the step of determining the existing motor mode of said motor by sensing a parameter representative of the voltage appearing at at least some of said motor winding leads.

25. The method of claim 24, wherein said sensing step comprises sensing relative voltage values appearing at at least some of said motor winding leads.

* * * * *